(12) United States Patent
Seel

(10) Patent No.: US 8,682,553 B2
(45) Date of Patent: Mar. 25, 2014

(54) METHOD AND DEVICE FOR ENGAGING A CLUTCH

(75) Inventor: Andreas Seel, Bonn (DE)

(73) Assignee: Robert Bosch GmbH, Suttgart (DE)

( * ) Notice: Subject to any disclaimer, the term of this patent is extended or adjusted under 35 U.S.C. 154(b) by 366 days.

(21) Appl. No.: 12/736,150

(22) PCT Filed: Nov. 25, 2008

(86) PCT No.: PCT/EP2008/066142
§ 371 (c)(1),
(2), (4) Date: Dec. 17, 2010

(87) PCT Pub. No.: WO2009/115144
PCT Pub. Date: Sep. 24, 2009

(65) Prior Publication Data
US 2011/0093175 A1 Apr. 21, 2011

(30) Foreign Application Priority Data
Mar. 19, 2008 (DE) .......................... 10 2008 000 770

(51) Int. Cl.
*G06F 7/00* (2006.01)
*G06F 17/00* (2006.01)
(52) U.S. Cl.
USPC .................. 701/68; 701/1; 701/117; 701/67
(58) Field of Classification Search
CPC ....................................................... G08G 1/095

USPC ................... 701/1, 117, 67, 68; 340/905, 907
See application file for complete search history.

(56) References Cited

U.S. PATENT DOCUMENTS

| | | | | |
|---|---|---|---|---|
| 5,411,124 A | * | 5/1995 | Olson | 192/103 R |
| 5,624,350 A | * | 4/1997 | Bates | 477/78 |
| 6,086,514 A | * | 7/2000 | Jones et al. | 477/180 |
| 6,253,140 B1 | | 6/2001 | Jain et al. | |
| 6,939,268 B2 | * | 9/2005 | DeVore et al. | 477/175 |
| 6,971,971 B2 | * | 12/2005 | Duskunovic et al. | 477/175 |
| 2002/0086769 A1 | * | 7/2002 | Hemmingsen et al. | 477/79 |
| 2003/0150683 A1 | | 8/2003 | Hoshiya et al. | |
| 2003/0232685 A1 | * | 12/2003 | Sugihara et al. | 475/269 |
| 2005/0056513 A1 | | 3/2005 | Reuschel | |
| 2005/0192155 A1 | * | 9/2005 | Duskunovic et al. | 477/166 |
| 2005/0197233 A1 | | 9/2005 | Hoshiya et al. | |
| 2007/0275810 A1 | * | 11/2007 | Sinojima et al. | 475/216 |
| 2008/0305931 A1 | * | 12/2008 | Eich et al. | 477/174 |
| 2011/0230307 A1 | * | 9/2011 | Seel | 477/5 |

FOREIGN PATENT DOCUMENTS

| | | |
|---|---|---|
| DE | 195 40 921 | 5/1997 |
| DE | 103 52 611 | 6/2005 |
| EP | 0 635 391 | 1/1995 |
| EP | 1 741 950 | 1/2007 |
| JP | 61-36446 | 3/1986 |

* cited by examiner

*Primary Examiner* — Ian Jen
(74) *Attorney, Agent, or Firm* — Kenyon & Kenyon LLP

(57) ABSTRACT

In a method for engaging a clutch having at least one previously known touch point position, the clutch is engaged according to a speed profile, the course of which depends on at least one of the previously known touch point positions.

7 Claims, 3 Drawing Sheets

METHOD AND DEVICE FOR ENGAGING A CLUTCH

BACKGROUND OF THE INVENTION

1. Field of the Invention

The present invention relates to a device and a method for engaging a clutch.

2. Description of Related Art

Such a clutch is used in a drive train of a motor vehicle, for example. A drive train usually includes a drive unit, a transmission and a drive axle having drive wheels, a clutch often being situated between the drive unit and the transmission. The power of the drive unit is transmissible via the clutch to the transmission and thus to the drive axle and the drive wheels. The proportion of the power transmitted via the clutch to the transmission is controllable by disengaging and engaging the clutch. Published German patent document DE 195 40 921 describes a clutch with which disengaging and engaging are executed by a servo drive. A desired clutch torque is implemented by triggering the servo drive.

BRIEF SUMMARY OF THE INVENTION

The method and the device according to the present invention for engaging a clutch are used for optimizing methods for touch point adaptation. The touch point position is understood to be the operating position of the clutch at which the clutch begins to transmit a torque between the drive unit and the transmission. This touch point position depends on several external parameters, for example, the temperature, wear, and age of the clutch. There are methods by which this touch point position is ascertained, so that torque transmission between the drive unit and transmission is accurately controllable. For the method according to the present invention for engaging a clutch, such a previously known touch point position exists, so that the clutch is engaged according to a speed profile, the course of which depends on at least one of the previously known touch point positions. As mentioned above, the touch point position depends on varying ambient parameters, so that the aforementioned method for ascertaining the touch point is repeated over and over again. Multiple previously known touch point positions are thus present, the last previously known touch point position in particular being present.

The technical background for engaging the clutch according to a speed profile, the course of which depends on at least one previously known touch point position, is that on the one hand, an excessively rapid approach to the touch point is to be avoided, while on the other hand, the duration for the entire engaging operation of the clutch is to be minimized. Approaching the unknown new touch point too rapidly would result in a jump in the torque transmission between the drive unit and the clutch. In addition to increased wear on the transmitting mechanical components, this could be noticeable for occupants in a vehicle as an unpleasant jolt.

The advantage of the present invention lies in a shortened method for engaging the clutch, in particular for touch point adaptations, and nevertheless a gradual approach to the new unknown touch point of the clutch.

In another embodiment of the present invention, the clutch passes through various operating positions when engaging, and the course of the speed profile depends on at least one of the previously known touch point positions, in such a way that the engagement speed of the clutch in an operating position depends on the distance between the operating position and the at least one previously known touch point position. The engagement speed decreases in particular with a decrease in the distance of the operating position from the at least one previously known touch point position.

The technical background of this embodiment is that an excessively rapid approach to the unknown new touch point is prevented, and thus a jump in the torque transmission between the drive unit and the clutch is prevented. In addition to increased wear on the transmitting mechanical components, this could be noticeable for the occupants in a vehicle as an unpleasant jolt.

The advantage of this embodiment is in a shortened method for engaging the clutch, in particular for touch point adaptations, and nevertheless a slow approach to the new unknown touch point of the clutch.

In another embodiment, the clutch passes through various operating positions when the clutch is engaged, and the course of the speed profile depends on the distance between at least two of the previously known touch point positions in relation to one another.

The technical background is that the distances between the touch point positions ascertained in succession may deviate very greatly among one another, depending on the design of the clutch and the use conditions.

The advantage of this embodiment is that by taking into account at least two touch point positions (instead of one as previously known) for determining the speed profile, the method for engaging the clutch, in particular for touch point adaptations, is shortened and nevertheless a slow approach to the new unknown touch point of the clutch is achieved.

In another embodiment, the engagement speed of the clutch does not fall below a predefinable minimum speed.

The technical background and advantage thereby is that a minimum speed for engaging the clutch should not drop below this minimum in order to maintain short engagement times of the clutch.

In another embodiment, the clutch passes through various operating positions when the clutch is engaged, and the course of the speed profile is subdivided into two phases. The clutch is first engaged at a first speed up to a speed-changing position, and then the clutch is engaged further at a second speed, which is in particular lower than the first speed.

The technical background is that the speed profile is subdivided into two phases in this embodiment. The clutch is engaged at a first speed up to an operating position of the clutch, the speed-changing position, which is to be determined. The clutch is next engaged further at a second speed. This second speed is in particular lower than the first speed.

The advantage of this embodiment is that the control is simplified due to the division of the speed profile into two individual phases. It nevertheless remains ensured that the new unknown touch point is approached at a predefinable speed.

In another embodiment of the present invention, the speed-changing position depends on at least one of the previously known touch point positions. The speed-changing position is in particular at a predefinable distance from at least one of the previously known touch point positions.

The technical background is that the speed-changing position as the operating position of the clutch is to be predefined, so that the new unknown touch point is approached at the second speed.

The advantage of this embodiment is the assurance that the new unknown touch point is approached at a predefinable second speed.

In another embodiment of the present invention, the predefinable distance of the speed-changing position to at least one of the previously known touch point positions depends on the distance between at least two of the previously known touch point positions in relation to one another. In particular, the predefinable distance of the speed-changing position to at least one of the previously known touch point positions depends on the distance between at least two of the previously known touch point positions in such a way that the predefinable distance of the speed-changing position to at least one of the previously known touch point positions is greater than the distance between at least two of the previously known touch point positions.

The technical background of this embodiment is that, depending on the design of the clutch and the use conditions, the distances between the previously known touch point positions ascertained may vary greatly. To ensure that the new unknown touch point is approached at a second speed, it is expedient to position the speed-changing position as an operating position of the clutch at a distance to at least one of the previously known touch point positions in such a way that the distance is greater than the distance between at least two of the previously known touch point positions in relation to one another.

The advantage of this embodiment is the assurance that the new unknown touch point is approached at a predefinable second speed, so that the speed-changing position as an operating position of the clutch is positioned at a distance to at least one of the previously known touch point positions in such a way that the distance is greater than the distance between at least two of the previously known touch point positions in relation to one another.

In a further embodiment, the distance between the operating positions of the clutch is processed in at least one measuring unit. The use of the measure of length and/or the measure of time is provided in particular.

The technical background is that the control according to the present invention is based on operating positions of the clutch. Depending on the system design, it may be advantageous to use not only one measuring unit but instead to use at least two measuring units wherein the measure of length and/or the measure time is offered in particular.

The advantage of this embodiment is that, depending on the system design, the sensors already present may be used, in particular for detecting the operating positions of the clutch, which measure in particular a measuring unit, e.g., the measure of length and/or the measure of time.

DETAILED DESCRIPTION OF THE INVENTION

Figure 1:
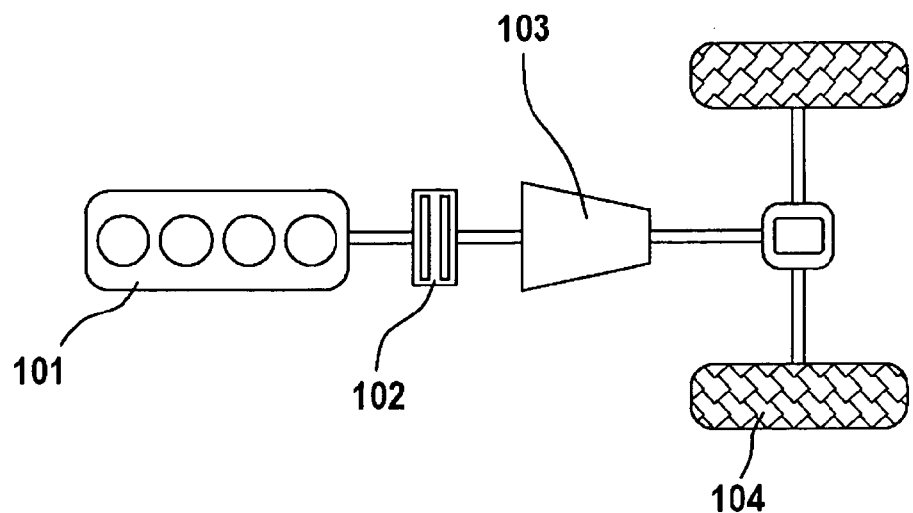
FIG. 1 shows a drive train of a vehicle.

FIG. 1 shows a drive train of a vehicle. The drive train is composed of a drive unit 101, in particular an internal combustion engine, a clutch 102, a transmission 103, and a drive axle having drive wheels 104.

Figure 2:
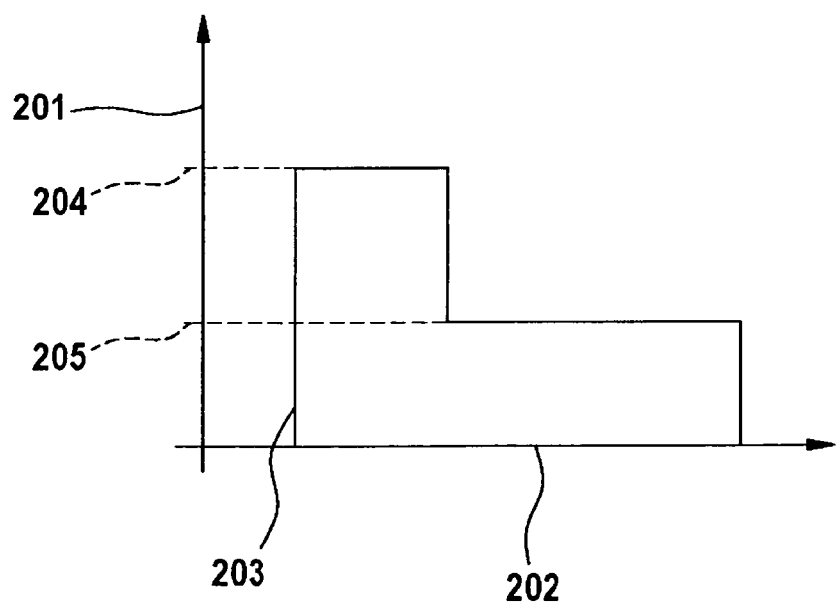
FIG. 2 shows a speed/time diagram.

FIG. 2 shows a speed/time diagram, the speed being plotted on y-axis 201 and the time being plotted on x-axis 202. A two-phase speed profile is plotted in this diagram. The clutch begins to engage at point in time 203. The clutch is first engaged at first speed 204, and beyond a speed-changing position, the clutch is engaged further at a second speed 205.

Figure 3:
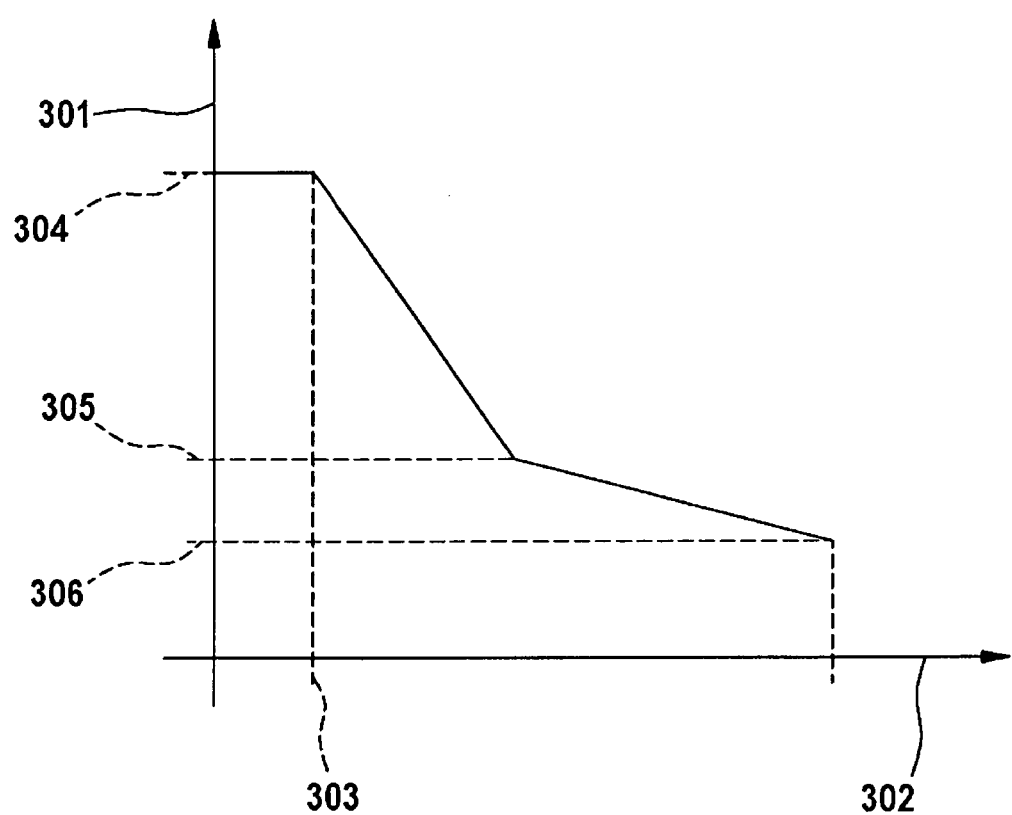
FIG. 3 shows a distance/time diagram.

FIG. 3 shows a distance/time diagram. The distance traveled by the clutch is plotted on y-axis 301. The time is plotted on x-axis 302. In operating position 304, the clutch is in the disengaged state. At point in time 303, the clutch is engaged at a first speed up to the operating position of speed-changing position 305. The clutch is next engaged at a second speed up to new unknown touch point 306.

Figure 4:
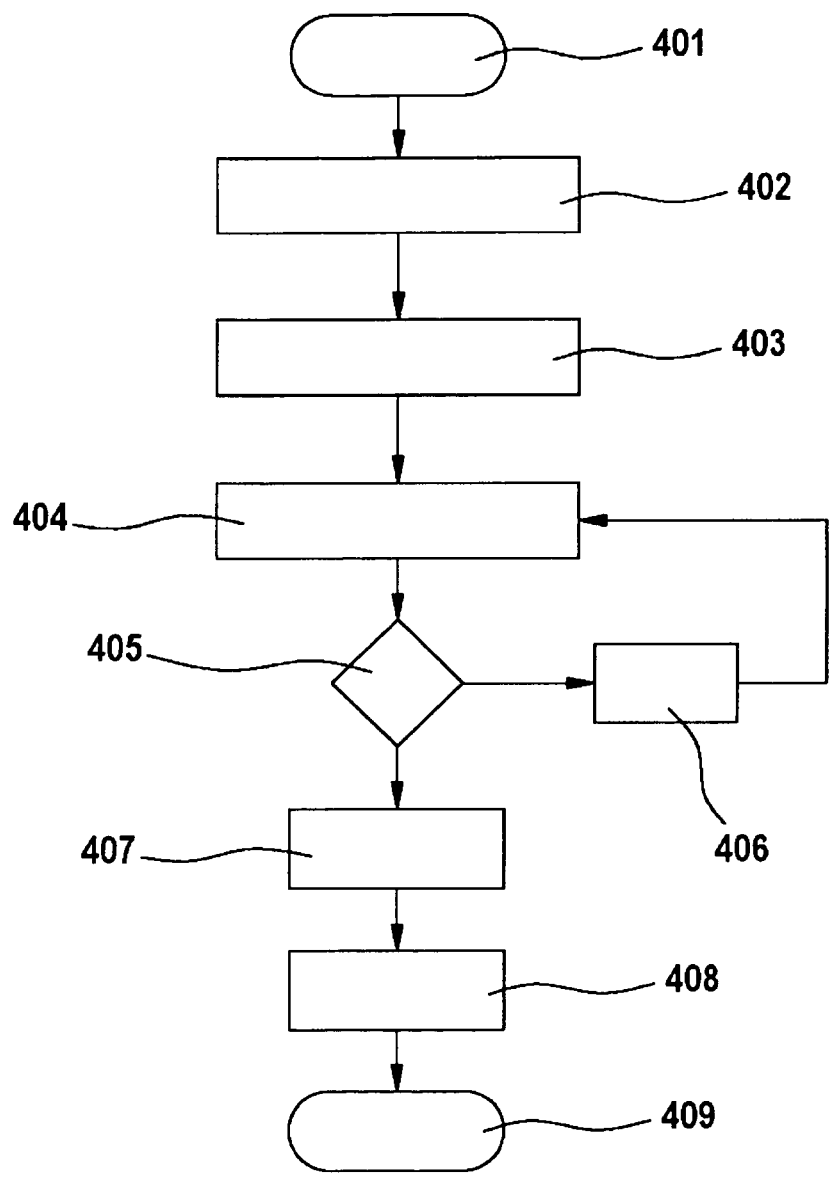
FIG. 4 shows a flow chart of the method for engaging a clutch.

FIG. 4 shows a flow chart of the method for engaging a clutch. The method starts at step 401. The at least one previously known touch point position is input in step 402. The operating position for the speed-changing position is calculated on the basis of the at least one previously known touch point position in step 403. The current operating position of the clutch is input in step 404. A check is performed in step 405 on whether the current operating position is still upstream from the speed-changing position. If the current operating position is still upstream from the changing position, then in step 406, the clutch is engaged further at the first speed. In this case, the method jumps back to step 404. If the current operating position is downstream from the changing position in step 405, then in step 407 the clutch is engaged further at the second speed. In step 408 in reaching the new unknown touch point, the latter is detected. This method ends with step 409.

What is claimed is:

1. A method of touch point adaptation for engaging a clutch, comprising:
   obtaining, by a measurement unit, at least one previously known touch point position;
   engaging the clutch at a first speed until the clutch reaches a predetermined distance from the at least one previously known touch point position; and
   engaging the clutch at a second speed less than the first speed after the clutch reaches the predetermined distance,
   wherein the clutch passes through various operating positions when the clutch is engaged, and further comprising decreasing the second speed as the clutch passes through the operating positions toward the at least one previously known touch point position.

2. The method as recited in claim 1, wherein multiple previously known touch point positions are obtained, and the clutch is engaged at the first speed until the clutch reaches the predetermined distance from the multiple previously known touch point positions.

3. The method as recited in claim 1, wherein the second engagement speed of the clutch does not fall below a predefined minimum speed.

4. The method as recited in claim 1, wherein multiple previously known touch point positions are obtained, and wherein the predetermined distance from the at least one previously known touch point position depends on a distance between at least two of the multiple previously known touch point positions, the determined distance from the at least one previously known touch point position being greater than the distance between the at least two of the multiple previously known touch point positions.

5. The method as recited in claim 1, wherein the predetermined distance is processed in at least one of a measure of length and a measure of time.

6. A device for touch point adaptation for engaging a clutch, comprising:
   a measurement unit for obtaining at least one previously known touch point position; and
   a engagement unit for engaging the clutch at a first speed until the clutch reaches a predetermined distance from the at least one previously known touch point position and engaging the clutch at a second speed less than the first speed after the clutch reaches the predetermined distance, wherein the clutch passes through various operating positions when the clutch is engaged, and further comprising decreasing the second speed as the clutch passes through the operating positions toward the at least one previously known touch point position.

7. The method as recited in claim 1, further comprising:

obtaining a plurality of previously known touch point positions;

selecting the predetermined distance from at least one of the previously known touch point position to be greater than a distance between at least two of the previously known touch point positions;

engaging the clutch at the first speed until the clutch reaches the selected predetermined distance from the at least one previously known touch point position; and engaging the clutch at the second speed after the clutch reaches the selected predetermined distance.

\* \* \* \* \*

UNITED STATES PATENT AND TRADEMARK OFFICE
CERTIFICATE OF CORRECTION

PATENT NO. : 8,682,553 B2
APPLICATION NO. : 12/736150
DATED : March 25, 2014
INVENTOR(S) : Andreas Seel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 593 days.

Signed and Sealed this

Twenty-ninth Day of September, 2015

Michelle K. Lee
*Director of the United States Patent and Trademark Office*